US008392002B2

(12) United States Patent
Pak et al.

(10) Patent No.: US 8,392,002 B2
(45) Date of Patent: Mar. 5, 2013

(54) HYBRID MACHINE CONTROL INCORPORATING FAST-TOOL SERVOS

(75) Inventors: H. Ali Pak, Bell Canyon, CA (US); Curtis S Wilson, Sherman Oaks, CA (US)

(73) Assignee: Delta Tau Data Systems, Inc., Chatsworth, CA (US)

( * ) Notice: Subject to any disclaimer, the term of this patent is extended or adjusted under 35 U.S.C. 154(b) by 284 days.

(21) Appl. No.: 12/904,619

(22) Filed: Oct. 14, 2010

(65) Prior Publication Data

US 2012/0095599 A1  Apr. 19, 2012

(51) Int. Cl.
| | |
|---|---|
| G05B 19/18 | (2006.01) |
| G05B 19/04 | (2006.01) |
| G05B 19/35 | (2006.01) |
| G05B 11/32 | (2006.01) |
| G06F 19/00 | (2011.01) |
| G01M 1/38 | (2006.01) |
| H02P 5/00 | (2006.01) |
| B23B 3/00 | (2006.01) |
| B23B 21/00 | (2006.01) |
| B23B 25/00 | (2006.01) |

(52) U.S. Cl. .......... 700/61; 700/189; 700/252; 700/275; 318/85; 318/573; 318/625; 82/117; 82/133; 82/162; 82/173

(58) Field of Classification Search .................. 82/117, 82/133, 162, 173; 318/85, 573, 625; 700/61, 700/189, 252
See application file for complete search history.

(56) References Cited

U.S. PATENT DOCUMENTS

| | | | |
|---|---|---|---|
| 5,625,267 A * | 4/1997 | Gregory | 318/625 |
| 5,751,585 A | 5/1998 | Cutler et al. | |
| 8,056,453 B2 * | 11/2011 | Savoie | 82/117 |
| 2005/0116676 A1 | 6/2005 | Geissdorfer et al. | |
| 2005/0223858 A1 * | 10/2005 | Lu et al. | 82/173 |
| 2007/0221019 A1 * | 9/2007 | Ethington et al. | 82/117 |
| 2007/0278980 A1 * | 12/2007 | Wilson | 318/573 |

* cited by examiner

Primary Examiner — Jeffrey A Gaffin
Assistant Examiner — Darrin Dunn
(74) Attorney, Agent, or Firm — Paul E. Lewkowicz P.C.

(57) ABSTRACT

Presently disclosed is a method and system for processing standard part description programs in real time into the tool position control data appropriate to a CNC machine's standard and high bandwidth mechanisms, respectively. The result is precise tool tip control that tracks the programmed path at all times while maintaining the appropriate feed rates and accelerations for each type of mechanism. In one exemplary embodiment, a hybrid mechanism employing a high bandwidth mechanism mounted on and moved by a standard mechanism is employed. The command vector for the high-bandwidth mechanism is computed by subtracting the tool tip vector filtered to comprise only the tool tip positions and trajectories realizable by the standard mechanism from an ideal tool tip trajectory vector that represents the complete programmed path. These calculations produce a synchronous set of movements for both standard and high bandwidth mechanisms.

33 Claims, 5 Drawing Sheets

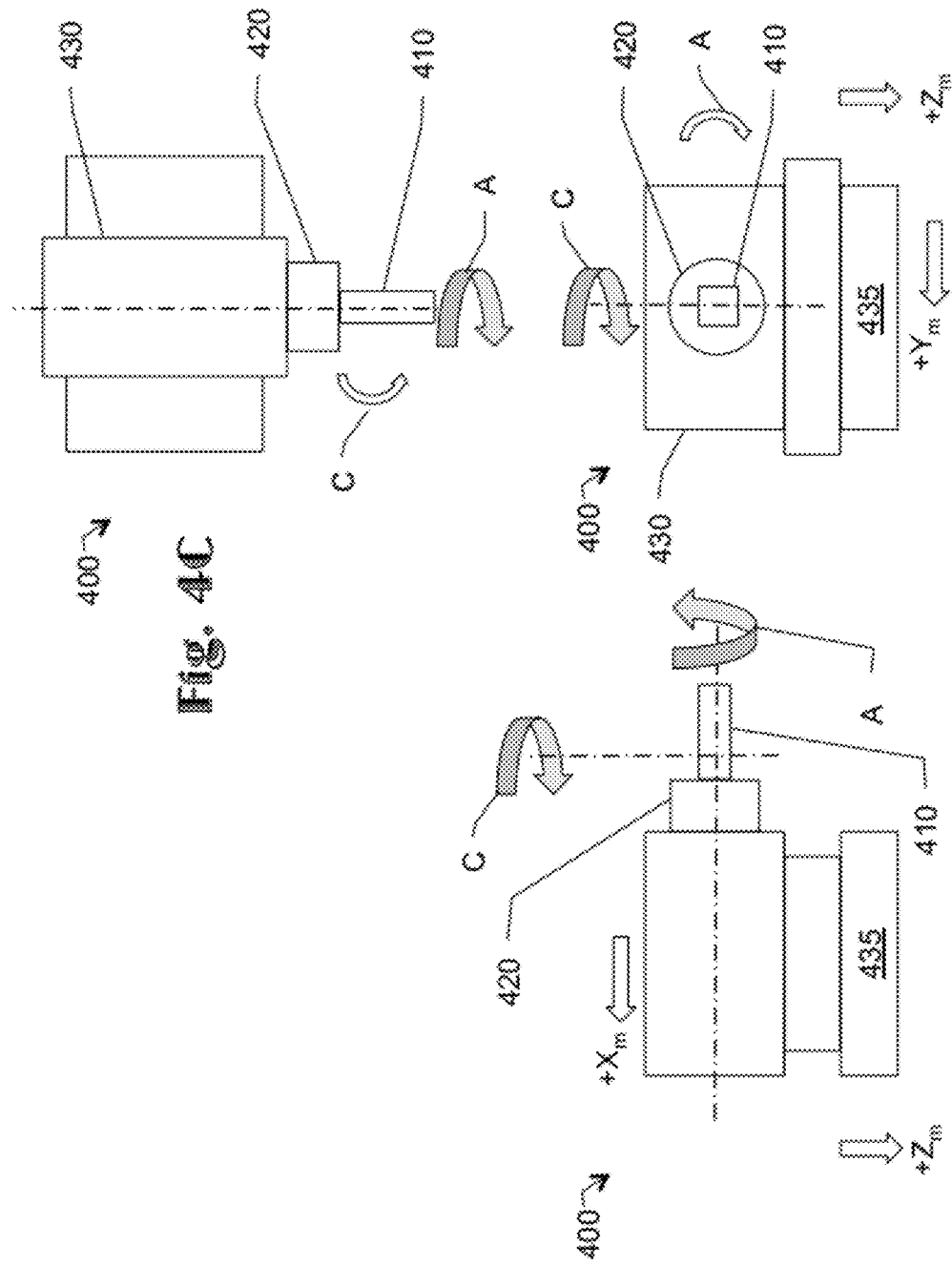

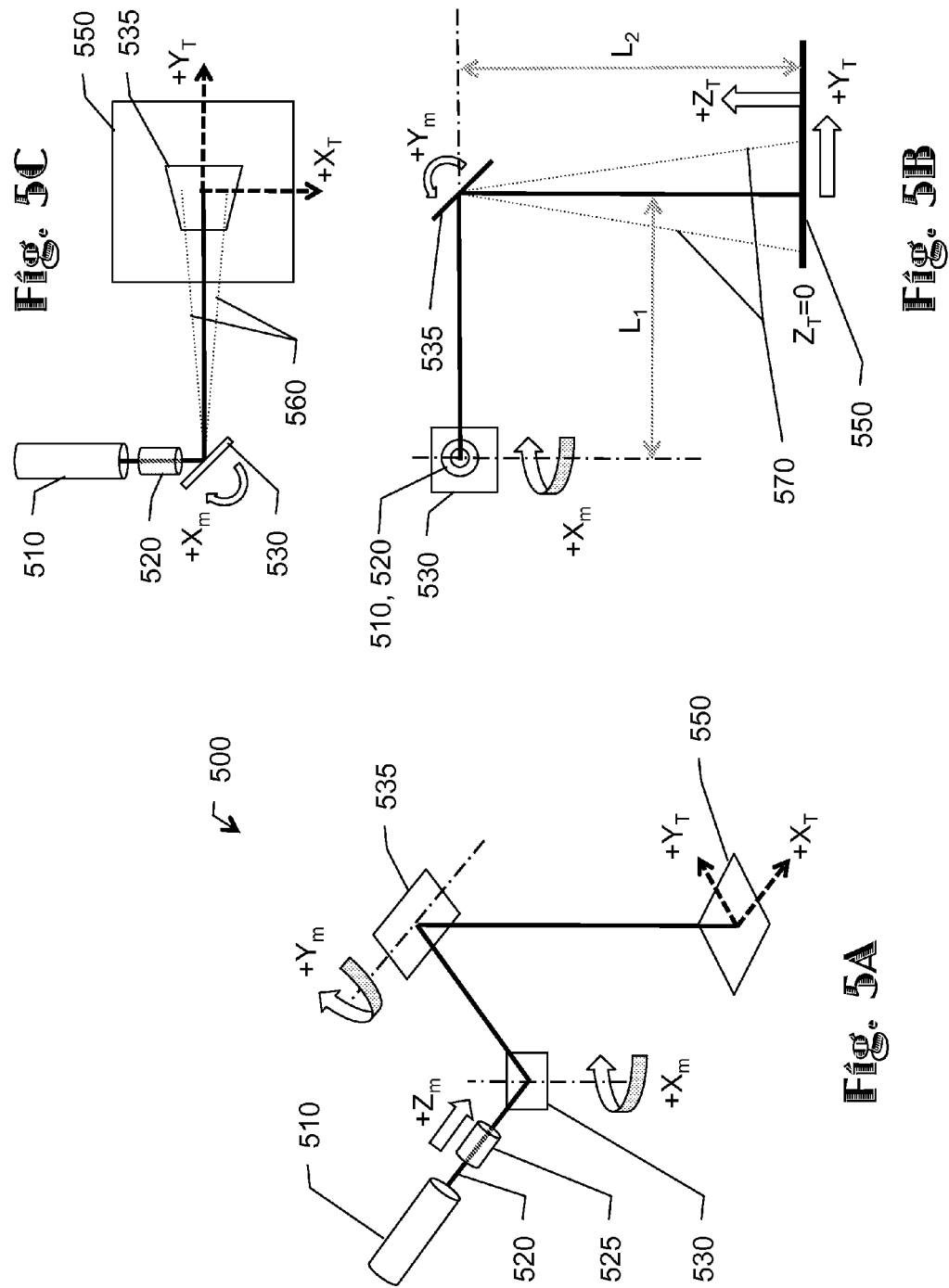

HYBRID MACHINE CONTROL INCORPORATING FAST-TOOL SERVOS

BACKGROUND

This invention relates to devices that provide automated motion or path control, such as but not limited to those used in computer-controlled machine tools, robots, and the like. Such path-based automatic positioning applications may comprise systems that provide multi-axis computer numerically controlled (CNC) machining systems, laser-marking systems, or electron-beam welding. Although the terminology commonly associated with CNC machining will be used throughout this description, those skilled in the in the automation, robotics, machining, and/or manufacturing arts will understand that the applications of this invention apply beyond the narrow realm of CNC machining. Accordingly, application of the invention is not to be construed as limited to only CNC machining.

A typical computer controlled machine tool includes, among other things: one or more controllers; one or more mechanisms each comprising one or more actuators, one or more sensors (whether discrete devices or embedded in the mechanisms), and a tool holder or tool head; and various data communication subsystems, display, and operator interfaces. Such a typical machine may have multiple, independent axes of controllable motion, depending on the type and number of mechanisms.

The continuing market need for higher productivity in machining and other automation applications has led to the increasing use of various types of advanced, ultra-high bandwidth mechanisms in these applications. These mechanisms, sometimes referred to as "fast" servomechanisms (colloquially, "fast servos"), comprise various sensors, actuators, and associated servo control electronics. In a machining application, these high bandwidth mechanisms may employ laser cutters or electron beams instead of the traditional metal cutting tools. For example, in one type of high bandwidth mechanism, a cutting laser beam is bounced off two mirrors whose angles are servo-controlled by galvanometers. Such high bandwidth mechanisms are known in the art to be faster than standard CNC mechanisms, but have much more limited travel or range of motion.

Fast servomechanisms are distinguished by their ability to move very quickly and very accurately, with the ability to track commanded trajectories with high-frequency content, necessitating a high servo loop bandwidth to compute commanded positions, sense actual positions, and update their servo commands to minimize the difference between commanded and actual positions. Commonly used types of these fast (high bandwidth) mechanisms include galvanometers, voice-coil actuators, piezoelectric actuators, and magnetostrictive actuators. Such "high bandwidth mechanisms" usually have a very limited range of motion. This typically results in their being coupled with standard, comparatively "slow" mechanisms that have a greater range of motion in order to cover the full range of the machine. Such standard mechanisms typically have significantly lower bandwidth, but can cover the full range of travel required.

Deciding which components of motion should be allocated to the high bandwidth mechanisms and which components of motion should be allocated to the standard mechanisms has not been an easy task. A common strategy has been to use the standard mechanism's control axes just to move the high bandwidth mechanism's control axes into range, then hold the standard mechanism still while the high bandwidth mechanisms do the actual operation in that zone. This "zone-by-zone" approach significantly limits throughput and flexibility, and creates difficulties in defining zones of operation in which the fast mechanism can act alone.

The problem is compounded by the common desire to use automatically generated tool tip paths from standard computer-aided design (CAD) and/or computer-aided manufacturing (CAM) (generally referred to as CAD/CAM) software. Typically, such software has no knowledge of these hybrid mechanisms or the algorithms to deal with them. In these situations, using standard "part description programs" from CAD/CAM software, which specify the net tool-tip paths) is not possible. This has led the designers of machines incorporating high bandwidth mechanisms to attempt to either write their own custom software or to create unique post-processing software specific to each machine. This is required in the prior art for both the case where the slow mechanisms are moved to a location and held still while the fast mechanisms move within their limited zone of motion and for the case where the slow and fast mechanisms are used simultaneously to create net relative motion between the tool and the part. For example, most typical post-processing software takes standard CAD/CAM output files and creates hybrid files that allocate different portions of the motion to the particular fast and slow mechanisms of a single machine. In either case, the custom software must have very precise knowledge of the mechanism configurations and controller algorithms in order to create the net tool tip path defined by the part description program. This problem is only exacerbated by the number and type of controller and mechanism suppliers on the market today and expected in the future.

A further complication is encountered if the machine has a complex geometric relationship between the tool tip coordinates (position and orientation) and the underlying actuator positions within each mechanism. This relationship, known in the art as the kinematic transformation, can be vastly more complex than the simple scaling and offset used on most Cartesian-geometry machines and is employed on more and more machines these days. This adds more complexity to any post-processing algorithm that could be used to allocate different components of motion to the fast and slow mechanisms, because a low bandwidth tool tip motion can require a high bandwidth actuator motion, or vice versa. (Note, however, that the typical scaling and offset required for converting between tool tip coordinates and actuator positions in a simple mechanism can be considered a subset of generalized kinematic transformations.)

Additionally, the movements of the fast and slow mechanisms are commonly commanded by different servo controllers with different update (servo) rates. This can be very difficult to coordinate properly, both in terms of the times for programmed moves (which are usually commanded in terms of speed or "feedrate", not time) and the "heartbeats" of the controllers' own time bases.

What is needed is a system and process that uses standard part description programs from commercially available CAD/CAM software and processes the data in real time to allocate the proper components of motion between the slow (standard) and fast (high bandwidth) mechanisms without requiring modification of the CAD/CAM software or adding a separate post-processing step.

SUMMARY

The above-noted deficiencies of the conventional approaches are solved by the new process and systems of the present invention further described below. This invention overcomes the deficiencies of the prior art by processing standard part description programs, as from commercially available CAD/CAM software, in real time into the tool position control data appropriate to the CNC machine's standard and high bandwidth mechanisms. The result is precise tool tip control that tracks the programmed path at all times while maintaining the appropriate feed rates and accelerations for each type of mechanism.

As used herein, the term "standard mechanisms" refers to control mechanisms that have a relatively low bandwidth for responding to commands and disturbances but a relatively wide range of travel commonly known and used in CNC machining. These include, but are not limited to, servo motors, stepper motors, and hydraulic cylinders. The terms "high-bandwidth mechanism" or "fast mechanism," as used herein, refers to mechanisms employing (in some embodiments) quick and precise actuators such as (but not limited to) galvanometers, voice-coil motors, piezoelectric actuators, electron beam magnetic deflectors, and magnetostrictive actuators.

In one exemplary embodiment, a hybrid mechanism employing a high bandwidth mechanism mounted on and moved by a standard mechanism, such as that used on a moving bridge CNC router, is employed. The tool tip trajectory defined in the part description program as a sequence of tool and/or part movements describes the position of the tool tip relative to the part or workpiece. This input sequence of commanded motions is interpolated in the controller into a tool tip trajectory in the coordinate frame of the tool tip relative to the part, represented herein as a series of ideal tool tip trajectory vectors. This ideal trajectory vector describes the coordinates of a point on the tool tip path independently of the underlying geometry of the target machine's mechanisms, which permits the software to operate without detailed knowledge of the mechanisms.

The ideal tool tip trajectory vector must be converted into a mechanism command vector that describes the positions of all of the target machine's standard actuators required to place the tool tip at the desired coordinates. This conversion is referred to as the inverse-kinematic transformation and results in a vector of the mechanism position commands in the coordinates of the mechanism controlling that tool. The resulting mechanism command vector therefore may be thought of as the "ideal" (yet unobtainable at the desired speeds) standard mechanism command vector, because at least some of these commanded positions are beyond the physical capabilities of the standard mechanism at the desired speeds.

Once the "ideal" command vector has been calculated, it is passed through a low-pass filter to obtain a filtered command vector that is a point on a trajectory that is within the capabilities of the standard mechanism. However, the filtered command vector is in the coordinates of the standard mechanism, not those of the tool tip. To determine the command vector for the high-bandwidth actuators, the filtered command vector must first be converted back to a filtered tool tip trajectory vector in tool tip coordinates. This conversion is referred to herein as the forward-kinematic transformation.

The filtered tool tip trajectory vector attainable by the standard mechanism defines the movements to be performed by the standard (slow) mechanism. The high bandwidth mechanism must make up the difference between the filtered tool tip trajectory vector and the ideal tool tip trajectory vector. Thus, the command vector for the high bandwidth mechanism is computed by subtracting the filtered tool tip vector from the ideal tool tip trajectory vector, resulting in the high bandwidth tool tip trajectory vector.

In this way, a complex part program may be rapidly and efficiently partitioned in real time into a synchronous set of movements for both standard (slow) and high bandwidth (fast) mechanisms that is best suited to the efficient use of an advanced, automated motion control system without the use of special purpose or custom software or post-processing steps.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

FIGS. 4A, 4B, and 4C are three views of a 5-axis mechanism for use with embodiments of the present invention, showing the axes of translation and rotation.

FIGS. 5A, 5B, and 5C are three views of a fast (high bandwidth) servo system employing a laser and adapted for use with the present invention.

DETAILED DESCRIPTION

Embodiments of the present method are generally directed to techniques for generating a controlled object trajectory in an automated machine.

As used herein, the term "standard mechanisms" refers to control mechanisms that have a relatively low bandwidth of response to commanded trajectories and disturbances but a relatively wide range of travel commonly known and used in CNC machining. These include, but are not limited to, servo motors, stepper motors, and hydraulic cylinders. The terms "high-bandwidth mechanism" or "fast mechanism," as used herein, refers to mechanisms employing (in some embodiments) quick and precise actuators such as (but not limited to) galvanometers, voice-coil motors, piezoelectric actuators, electron beam magnetic deflectors, and magnetostrictive actuators.

Figure 1:
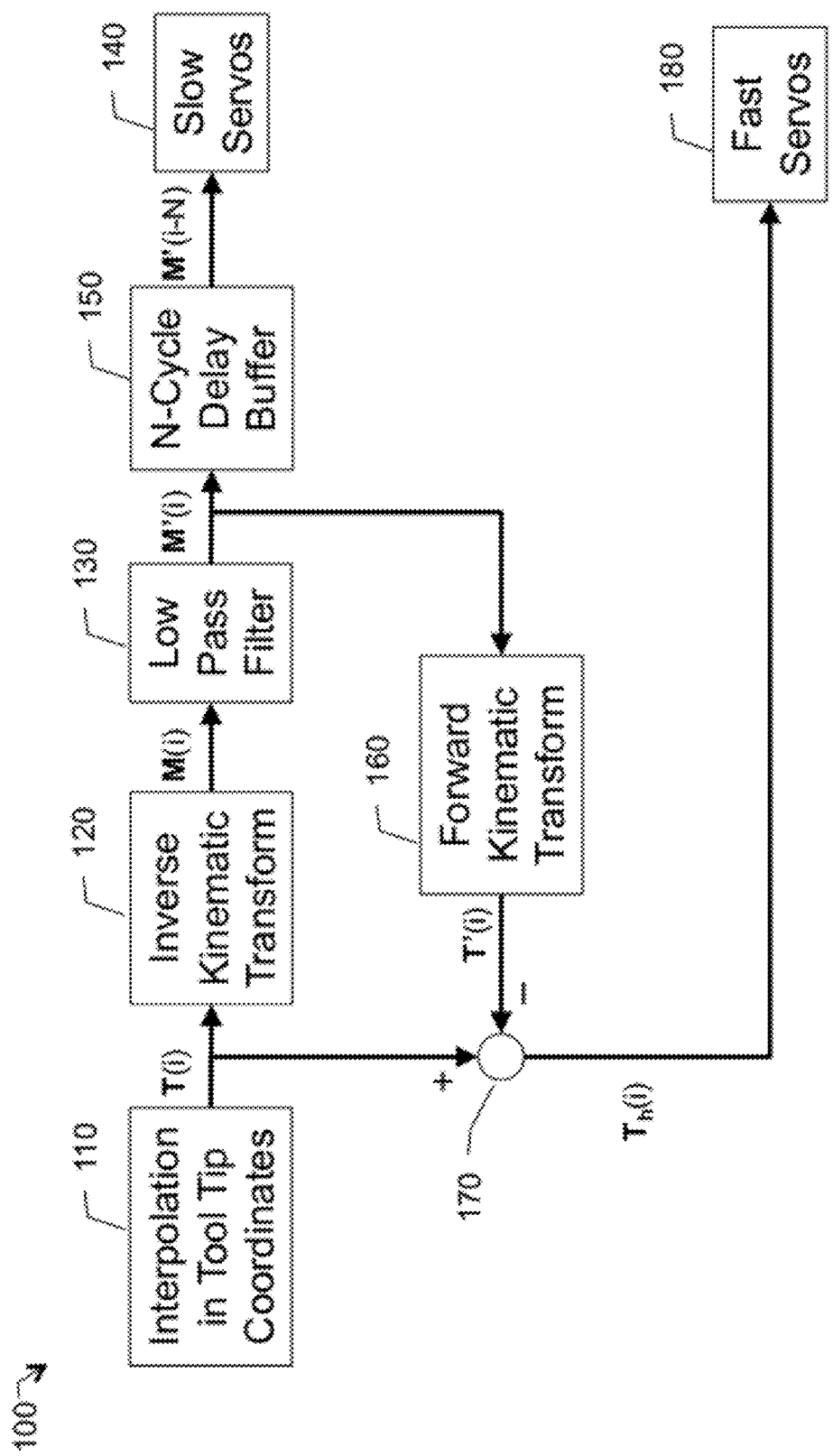
FIG. 1 is a block diagram of a generalized hybrid machine control system according to one embodiment of the present invention.

In one exemplary embodiment, a hybrid mechanism employing a high bandwidth mechanism mounted on and moved by a standard mechanism, such as that used on a moving bridge CNC router, is employed. FIG. 1 illustrates how the present invention may be used to improve throughput and manufacturing efficiency in such a typical application.

The tool tip trajectory defined in the part description program as a sequence of tool and/or part movements including, but not limited to, lines, arcs, and splines, describes the position of the tool tip relative to the part or workpiece. This input sequence of commanded motions is interpolated 110 in the controller 100 into a tool tip trajectory in the coordinate frame of the tool tip relative to the part. This sequence is represented herein as a series of ideal tool tip trajectory vectors $T(i)$, where "i" is the servo cycle index number for each set point in the sequence of tool tip positions. Each element of an individual vector is one of the coordinates of the tool tip position and/or orientation for that cycle. The time series of these vectors over multiple servo cycles constitutes the overall tool tip trajectory sequence. This ideal trajectory vector describes the tool tip path independently of the underlying geometry of the target machine's mechanisms. This permits the CAD/CAM software or other means of generating a part description program to operate without detailed knowledge of the mechanisms that will implement the program, permitting a wider range of part program generation tools to be used.

The type of tool actually used is not important, since the partitioning and translation of the work performed by the actuators and servos of the fast and slow mechanisms, and the division therebetween, is the focus of the present invention. Thus, although tools of various types are described, those skilled in the art will realize that tools other than those named, or indeed known today, can be used. Accordingly, the invention is not limited to any particular type of tool.

The ideal tool tip trajectory vector $T(i)$ is not necessarily in the tool tip coordinates. In such cases, vector $T(i)$ may be converted into the mechanism command vector $M(i)$ that describes the positions of all of the target machine's standard actuators required to place the tool tip at the desired coordinates. This conversion is referred to as the inverse-kinematic transformation 120 and results in a vector of the standard mechanism position commands in the coordinates of the standard mechanism controlling the relative positions of the tool and workpiece.

To this point, the system has operated as if all of the standard mechanisms each had the responsiveness and capability necessary to execute the entire part program. The resulting command vector $M(i)$ therefore may be thought of as the "ideal" (yet unobtainable at the desired speeds) standard mechanism command vector, because at least some of these commanded position vectors in the trajectory are beyond the physical capabilities of the standard mechanism.

Once the "ideal" command vector $M(i)$ has been calculated, it is passed through a low-pass filter 130 to obtain a filtered command vector $M'(i)$ that is within the capabilities of the standard mechanism. The movements determined by the filtered command vector $M'(i)$ are then ready to be fed to the servo loops of the standard mechanism 140 as set points to command those components of the motion realizable by the standard mechanisms. Optionally, a delay buffer 150 may be used to compensate for any processing or transport delays caused by the computation and/or transmission of the high bandwidth mechanism command vector to the fast mechanisms, discussed further below, so that the fast and slow mechanisms work in synchrony. For example, if there is a one-cycle delay in transporting data to a separate high-bandwidth controller, and another one-cycle delay in processing this data in the separate controller to generate the actuator setpoints for the high-bandwidth mechanism, then the high-bandwidth mechanism could be two cycles (J=2) behind the standard mechanism. In such a case, the filtered data $M'(i)$ should be intentionally delayed two cycles (N=2) before being used as setpoints for the standard mechanism in order to maintain complete synchrony between the controllers. That is, in cycle "i," the command vector $M'(i-N)$ should be set to the servo loops for actuators of the standard mechanism. Because the standard actuators often do not require servo loop closure rates at as high a frequency as the high-bandwidth actuators, one or more setpoints can be skipped between successive loop closures of the standard mechanism without loss of synchrony or performance.

The filtered command vector $M'(i)$ is in the coordinates of the standard mechanism, not necessarily those of the tool tip. To determine the command vector for the high-bandwidth actuators, $M'(i)$ may first be converted back to a filtered tool tip trajectory vector $T'(i)$, in tool tip coordinates. This conversion is referred to herein as the forward-kinematic transformation 160.

Recall that interpolation 110 initially determined the ideal tool tip coordinates $T(i)$ from the input part program using an interpolation algorithm. The filtered tool tip trajectory vector $T'(i)$ attainable by the standard mechanism defines the movements to be performed by the standard (slow) mechanism. The high-bandwidth mechanism must make up the difference between these two trajectory vectors. Thus, the command (or set point) vector for the high-bandwidth mechanism is computed by subtracting the filtered tool tip vector $T'(i)$ from the ideal tool tip trajectory vector $T(i)$ for every servo cycle "i," resulting in the high bandwidth tool tip trajectory vector $T_h(i)$. The subtraction step may be implemented in summer 170, which can be implemented in any of a number of devices well known to those of ordinary skill in these arts.

Once the high bandwidth tool tip trajectory vector $T_h(i)$ has been computed, additional coordinate transformations (not shown) may be necessary, depending on the particular machine and mechanism configuration. In some embodiments, the vector $T_h(i)$ must be converted to the coordinates of the high bandwidth (fast servo) mechanism 180, using the inverse-kinematic transformation for that mechanism (which can be different from that of the standard mechanism), yielding the high bandwidth mechanism command vector $M_h(i)$. In other embodiments, the high bandwidth mechanism controller (part of fast servo mechanism 180) may be able to convert from tool tip to mechanism coordinate frames internally, thus obviating the need for an external conversion step.

One or more separate controllers, either logically or physically distinct from the controller or controllers used to direct the standard mechanism, may control the high bandwidth mechanism. In these cases, the commanded set points for the high bandwidth mechanisms must be communicated to this separate controller. As discussed previously, the set points may be in tool tip coordinates (i.e., $T_h(i)$), in which case any required inverse-kinematic transformation must be performed in the high-bandwidth controller, or in motor coordinates ($M_h(i)$), in which case any inverse-kinematic transformation would have to have already been performed. In either case, these computations may introduce a delay in the availability of the commanded set points for the high bandwidth mechanisms.

Also, the communications between the controllers may also introduce a delay. While this communication of the command vectors may be done using any commonly available high-speed synchronous motion communications networks or circuitry (such as SERCOS™, MACRO™, or EtherCAT, all of which are well known in the art) designed for high-frequency cyclic coordinate transfer, such methods of transmission may also result in at least a one-cycle delay. (SERCOS and "SERCOS interface" are trademarks of SERCOS International e. V. of Suessen, Germany.) The likely presence of these delays necessitates the provision of an adjustable N-cycle delay buffer 150 in the standard mechanism trajectory data stream discussed above.

Although FIG. 1 illustrates only one slow servo mechanism 140 and one fast servo mechanism 180, those of ordinary skill will readily appreciate that (as noted above) the present system and methods are appropriate and applicable to the control of multiple mechanisms of each type, without limitation. FIG. 1 thus correctly labels servos 140 and 180 in the plural, since one or more mechanisms of each type may be employed.

Figure 2:
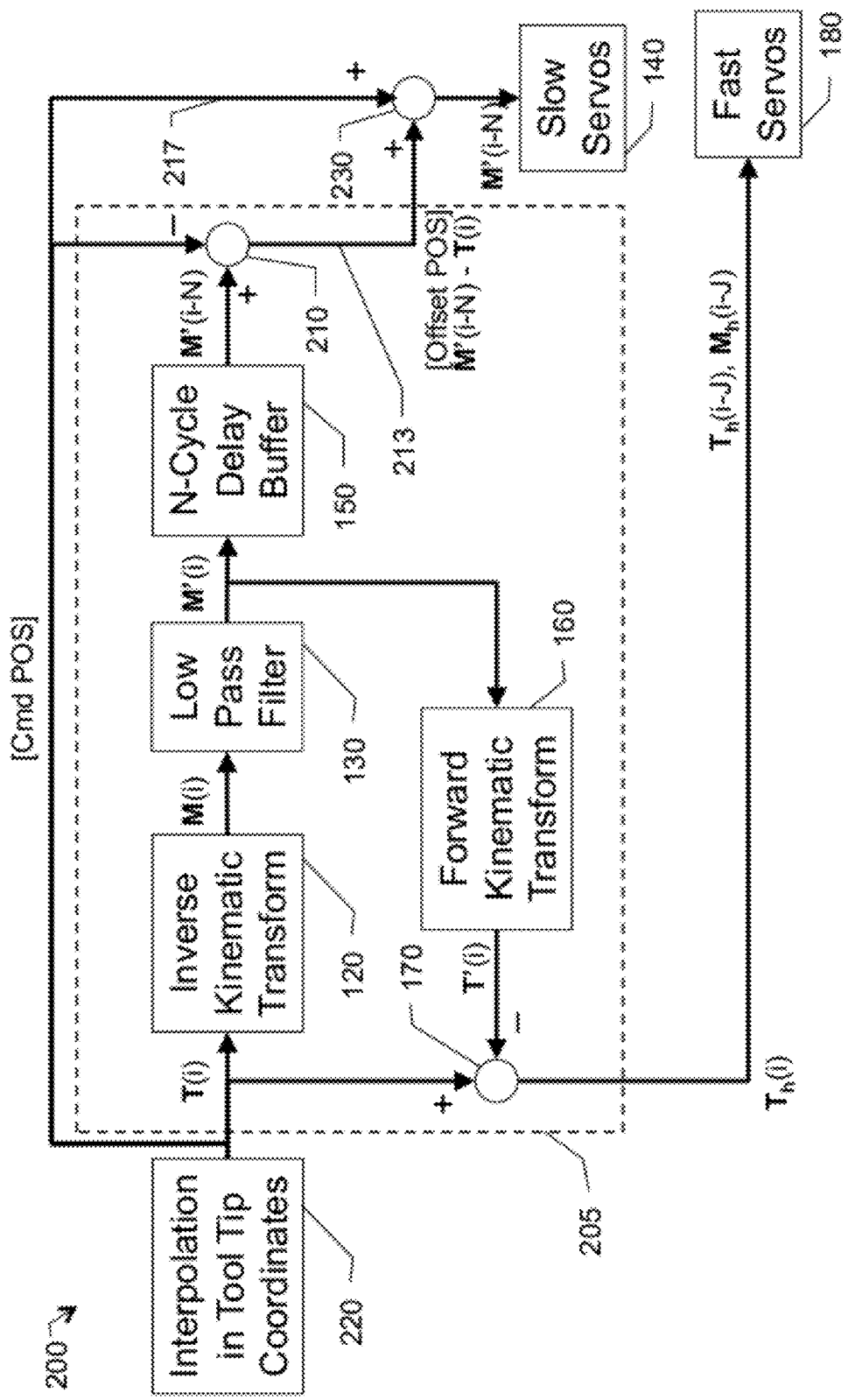
FIG. 2 is a block diagram of a specific implementation of a hybrid machine control system according to one embodiment of the present invention, utilizing a commercially available controller and a combination of standard and custom algorithms for that controller.

FIG. 2 illustrates a specific embodiment of the present invention within a commercially available controller 200, using as many standard features of that controller as possible. In some embodiments, functional blocks 120, 130, 150, 160, and 170 are grouped together for execution in, for example but not by way of limitation, a custom ASIC or analogous hardware or software 205 within or attached to controller 200. One of ordinary skill in the art will also recognize that other functional groupings in custom or off-the-shelf hardware, software, and/or firmware are also possible. Accordingly, the present invention is to be understood to encompass all such functional groupings and structural embodiments.

A significant difference in operation from the system of FIG. 1 stems from the fact that the standard interpolation algorithms automatically send the pre-transformed, pre-filtered points 217 directly to the slow servos 140. This means that the custom algorithms must compute offsets 213 to these coordinates that are added back in by the standard summing junction 230. Summing junction 210 subtracts the original trajectory point T(i) from the transformed, filtered, and delayed point M'(i−N) to compute this offset.

Figure 3:
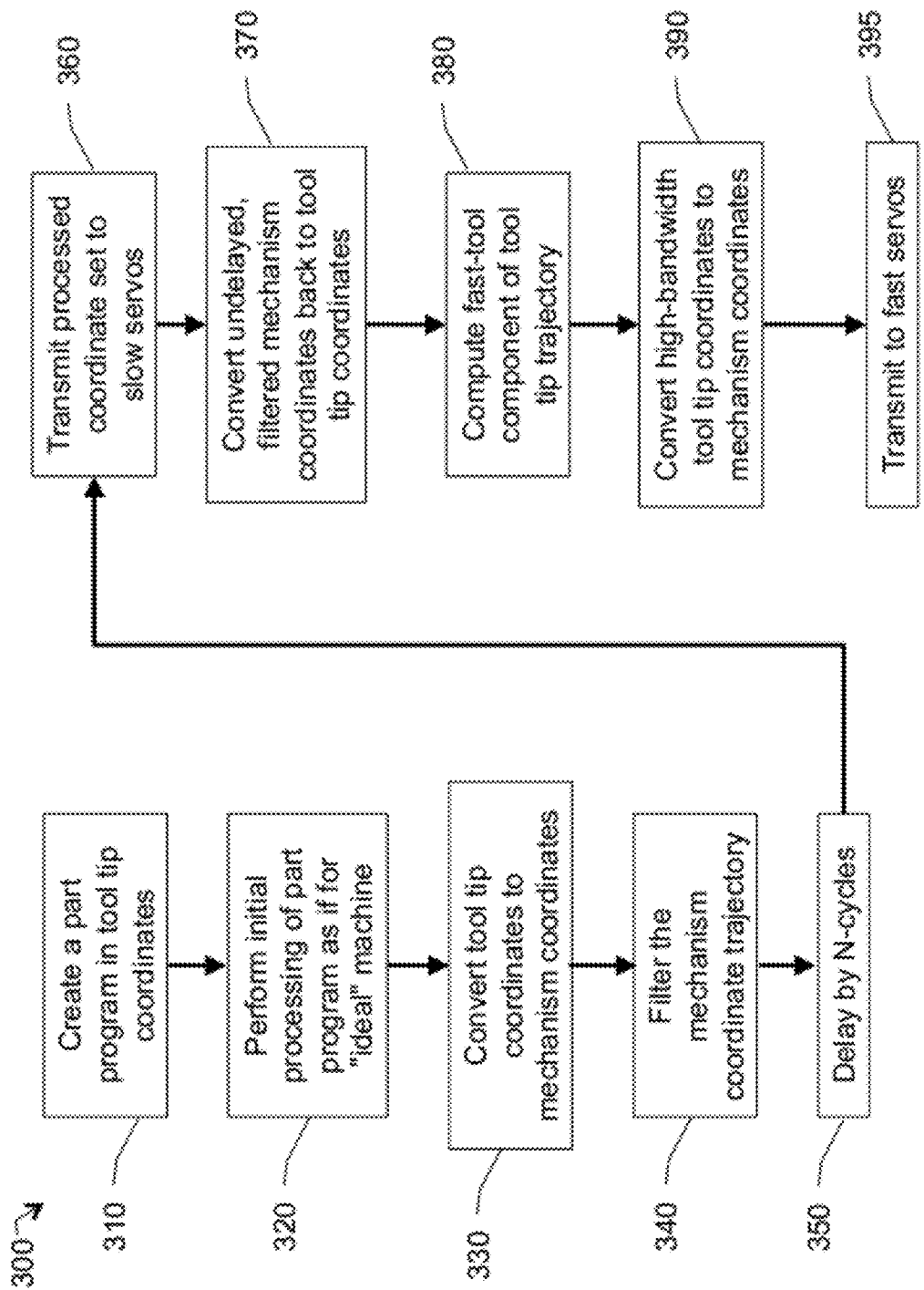
FIG. 3 is a flowchart of the hybrid machine control computational process, according to one embodiment of the present invention.

The apparatus of FIG. 1 can also be described in general terms by the process it carries out, as represented by process flow 300 in FIG. 3. In step 310, the part is described using a part program in tool tip coordinates. The tool tip positions are then interpolated (step 320) to determine the "ideal" tool tip position vector T(i), followed by the inverse kinematic transformation required to convert the coordinate vector into mechanism coordinates (step 330). The mechanism coordinate vector is then low-pass filtered in step 340 to obtain the slow mechanism component of the tool trajectory, which may (in some embodiments) be buffered in step 350 before transmission to the slow mechanism at step 360.

At substantially the same time, the filtered mechanism coordinate trajectory M'(i) is also passed to the forward kinematic transform of step 370, resulting in filtered tool tip trajectory vector T'(i). This vector is used to compute the fast tool tip trajectory $T_h(i)$ in step 380.

In some embodiments, an additional step 390 may be necessary to convert the fast tool tip coordinates into mechanism coordinates appropriate to the fast servos. The processed coordinates are then transferred to the fast servos in step 395.

In one of the simplest implementations, a short-stroke high-bandwidth actuator such as a piezoelectric stack is mounted on a standard linear actuator like a servomotor-driven leadscrew or a linear servomotor. Both actuators provide linear motion in the same direction, with the high-bandwidth actuator providing motion relative to the standard actuator and the standard actuator providing motion relative to the machine's base frame. The motion of the tool tip relative to the base frame is the sum of these two motions.

This hybrid mechanism moves the tool against a workpiece on a rotating spindle whose axis of rotation is fixed on the machine's base frame. This motion can be in the radial direction, permitting non-circular turning of parts such as engine pistons (which are machined to a slightly non-circular cross section so in high-temperature use as the interior cross-arm expands the operational cross section becomes circular) and cams. In this case, a second linear actuator provides motion in the axial direction, parallel to the spindle axis of rotation. In most implementations of this type, neither the axial linear actuator nor the spindle requires a high-bandwidth actuator to improve throughput. A complex kinematic transformation is also not generally required, although (for purposes of this application) any coordinate transformation necessary to translate tool tip to mechanism coordinates (or vice versa) is generally referred to as a kinematic transformation. Here, the kinematic transforms necessary are reduced to the simplest forms, namely the mathematically linear scaling and offset kinematic transformation.

Alternately, the hybrid mechanism can provide motion in the axial direction, against the face of the cylindrical workpiece on the spindle, permitting high-speed machining of complex optical surfaces on mirrors and lenses. In this case, a second linear actuator provides motion in the radial direction, perpendicular to the spindle axis of rotation. As in the first version of this implementation, neither the second linear nor axis nor the spindle requires a high-bandwidth actuator to improve throughput.

In another alternate implementation, the workpiece is placed on a Cartesian stage comprised of stacked perpendicular standard linear actuators, permitting the workpiece to be moved in a plane. Above the plane, high-bandwidth actuators move or deflect the tool that act on the workpiece. In one case, two rotating mirrors driven by galvanometers deflect a laser beam so that it can be moved at high speeds and frequencies over a small planar area of the workpiece. In another case, two electromagnets deflect an electron beam (as in a cathode ray tube). Such a configuration is illustrated in FIGS. 5A through 5C. In FIG. 5A, beam source 510 (e.g., a laser or electron gun) directs a beam 520 along the $Z_m$ axis and through optional external focus device 525. Beam 520 reflects off of first rotating mirror 530 and second rotating mirror 535, which rotate around the $X_m$ and $Y_m$ axes, respectively. The beam then reaches the focus plane at the workpiece (omitted for clarity) on Cartesian (XY) stage 550. FIG. 5B illustrates the coordinate system when viewing from directly above Cartesian stage 550. In this view, rays 560 represent the range of motion of beam 520 afforded by first rotating mirror 530. FIG. 5C shows beam 520 passing from first mirror 530 to second mirror 535 before reaching Cartesian stage 550. Rays 570 show the range of motion of beam 520 afforded by second rotating mirror 535. Distance L1 represents the separation between the rotating mirrors while L2 represents the distance from the second mirror 535 to the focus plane.

In a variation of the second implementation, the Cartesian stage 550 may be replaced by a rotary table (also known as a polar stage, using R-theta or polar coordinates, and well known in the art) to hold the workpiece and a radial arm to move the tool in a linear motion. Since the natural coordinates for this type of mechanism are polar coordinates, the Cartesian motion description will need to be processed through a kinematic transformation to translate it into polar coordinates.

In yet another implementation, the workpiece may be held by a standard 5-axis CNC manipulator with two rotary axes riding on a 3-axis Cartesian stage, permitting the workpiece to be moved and oriented very flexibly within the work envelope. FIGS. 5B and 5C show the same mechanism in side (FIG. 5B) and top (FIG. 5C) views to illustrate the coordinate frame. Above the workpiece, two rotating mirrors driven by high-bandwidth galvanometers deflect a laser beam to different locations on the workpiece. In a common variant, the "vertical" axis that controls the distance between the laser tool and standard mechanism moves the tool rather than the workpiece—this variant has no impact on the equations presented below.

In another exemplary embodiment, the invention is employed in the laser machining of sculpted 3D parts, such as (but not limited to) dental implants. In such an application, the part may be held in a multi-axis CNC machine, such as but not limited to a 5-axis machine having three translational (e.g., the 3-axis Cartesian stage 530 noted above) and two rotational axes of movement control. In a typical embodiment, the part is translated and rotated by standard mechanisms such as servomotors, and the laser beam is deflected by high-bandwidth mechanisms such as galvanometers. The combination of part movement and laser deflection determines where the laser beam strikes the part.

In such an embodiment, the kinematic transformations for both the standard and high-frequency mechanisms can be running in parallel, as can the low pass filters (LPFs) operating on all of the standard mechanisms.

FIGS. 4A through 4C shows multiple views of one such 5-axis CNC standard mechanism 400 that would hold the workpiece. Linear X, Y, and Z-axis mechanisms move the workpiece holder 430 relative to the machine's base frame 435 in the three fundamental Cartesian directions. A rotary A-axis mechanism 420 rotates the workpiece about the X-axis. A rotary C-axis mechanism 410 mounted on the A-axis mechanism rotates the workpiece about the Z*-axis, which is coincident with the base reference Z-axis when the A-axis mechanism is in its reference (zero) position. FIGS. 4B and 4C show the side and tops views of 5-axis mechanism 400.

The motion of the three linear and two rotary axis mechanisms provide motion of the workpiece mounted on the end of the mechanism with five degrees of freedom relative to a fixed tool tip. In many systems of this type, the Z-axis relative motion between the workpiece and the tool is provided by moving the tool in the Z-axis instead of the workpiece, but this makes no difference in the mathematical algorithms.

When the part description program describes the commanded path of the tool-tip relative to the workpiece, each point T(i) of this path must be converted from these tool-tip coordinates to the underlying coordinates for the axes of the mechanism M(i) through the inverse kinematic transformation for the mechanism. For the mechanism 400 shown in FIG. 4, the transformation can be described by the following equations:

$$X_M = (X_T + X_{CR})\cos(C_T) - (Y_T - Y_{CR})\sin(C_T)$$

$$Y_M = (X_T + X_{CR})\cos(A_T)\sin(C_T) + (Y_T + Y_{CR})\cos(A_T)\cos(C_T) + (Z_T + Z_{CR})\sin(A_T)$$

$$Z_M = (X_T + X_{CR})\sin(A_T)\sin(C_T) + (Y_T + Y_{CR})\sin(A_T)\cos(C_T) + (Z_T + Z_{CR})\cos(A_T)$$

$$A_M = A_T$$

$$C_M = C_T$$

In these equations, the "M" subscript denotes mechanism coordinates, the "T" subscript denotes tool tip coordinates, and the "CR" subscript represents constant offsets of the program reference point from the C-axis center of rotation.

Once a mechanism vector M(i) is calculated for a point on the ideal trajectory, it must be passed through a digital low-pass filter to create a matching point M'(i) on the band-limited trajectory that is within the capabilities of the standard mechanism. Many such filtering algorithms are possible, but most are of the "auto-regressive moving-average" (ARMA) linear filter style well known in the art. These filters can be implemented by and equation of the following type:

$$M'(i) = K[M(i) + N_1 M(i-1) + N_2 M(i-2) + \ldots - D_1 M'(i-1) - D_2 M'(i-2) - \ldots]$$

For analytical purposes, such an ARMA filter can be represented by a digital transfer function of the following type:

$$F(z) = \frac{M'(z)}{M(z)} = K \frac{1 + N_1 z^{-1} + N_2 z^{-2} + \ldots}{1 + D_1 z^{-1} + D_2 z^{-2} + \ldots}$$

where, using standard notation, $z^{-n}$ represents a delay of n cycles (that is, it uses data stored from n cycles previously).

A typical low-pass filter would use a digital implementation of a second-order Butterworth filter. The analog (continuous) transfer function of such a filter is $$F(s) = \frac{\omega_n^2}{s^2 + 2\zeta\omega_n s + \omega_n^2}$$

where $\zeta$ is the damping ratio (0.707 for a Butterworth filter) and $\omega_n$ is the natural frequency (effectively equivalent to the bandwidth for a Butterworth filter).

Digitizing this filter using the relationship $s=(1-z^{-1})/T_s$, where $T_s$ is the filter sample time (the servo update period in this case), and calculating the coefficients for a natural frequency of 50 Hz (or 314 sec$^{-1}$) and a sample time of 50 microseconds, the filter coefficients are:

K=0.000241079
$D_1$=−1.977805
$D_2$=0.9780464
(all other coefficients=0.0)

A separate LPF acts on each axis in the collection of standard mechanisms in the 5-axis CNC. There is no requirement that the same filter coefficients or even filter structure operate on different axes.

Filters of the ARMA type require that one or more filter outputs from previous cycles be stored. In some embodiments, these stored outputs may be used as a delay buffer if one is needed to maintain synchrony in the case of transport and/or calculation delays with regard to the high-bandwidth controller.

The vector M'(i) of filtered mechanism positions for servo cycle i must next be converted back into tool tip coordinates through the forward kinematic transformation for the standard mechanism. For the 5-axis CNC mechanism of FIG. 4, the transformation can be described by the following equations:

$$X_T = X_M \cos(C_M) - Y_M \cos(A_M)\sin(C_M) + Z_M \sin(A_M)\sin(C_M) - X_{CR}$$

$$Y_T = -X_M \sin(C_M) + Y_M \cos(A_m)\cos(C_M) + Z_M \sin(A_M)\cos(C_M) - Y_{CR}$$

$$Z_T = -Y_M \sin(A_M) + Z_M \cos(A_m) - Z_{CR}$$

$$A_T = A_M$$

$$C_T = C_M$$

where all terms are defined as for the above inverse kinematic equations. The resulting vector T'(i) of filtered tool tip coordinates for servo cycle i contains the position of the laser tool tip relative to the part if only the filtered motion of the standard mechanism(s) were occurring, with the high-bandwidth actuators for laser beam deflection still in their reference (zero) positions.

The difference between the original ideal tool tip vector T(i) and the filtered tool tip vector T'(i) for servo cycle i is the component $T_h(i)$ of the tool tip coordinates that must be made up by the high-bandwidth mechanisms—in this case, the laser mirror galvanometers. In this implementation, only three of the five coordinates in the vector—$X_{Th}$, $Y_{Th}$, and $Z_{Th}$—can be contributed by the high-bandwidth mechanisms, so the angles A and C at which the tool contacts the part may not be exact.

If there is a separate controller for the high-bandwidth mechanisms, the (executable) coordinates of the $T_h(i)$ vector must be transported to that controller through some communications means. This may create a transport delay of one or more cycles and thus a delay mechanism, of any suitable form well known in the art, may be used.

The laser mirror galvanometer system has its own kinematic transformation between the laser beam's tool tip coordinates and the underlying mechanism coordinates. FIGS. 5A through 5C illustrate the geometry of a typical system 500 of this type.

In this configuration, the beam 520 leaves the laser on a horizontal path parallel to the target plane 550, passing through a movable focusing mechanism 525 ($Z_M$). The first mirror 530 ($X_M$), a distance $L_0$ from the reference position of the focusing mechanism 525, reflects the beam by approximately a right angle (depending on its exact angle), keeping it in a plane parallel to the XY target plane 550 (regardless of its angle). The second mirror 535 ($Y_M$), whose center of rotation is a distance $L_1$ from the center of rotation of the first mirror (see FIG. 5B), reflects the beam toward the horizontal XY reference target plane 550, whose center point (with programmed $Z_T$=0) is a distance $L_2$ away from the center of rotation of mirror 535.

The "zero" position for each mirror motor orients the mirror at a 45-degree angle relative to the incoming beam, permitting it to reflect a beam at angles near right angles. Note that a one-degree change in the mirror orientation leads to a two-degree change in the path of the laser beam leaving it.

The inverse kinematic transformation for this subsystem required to compute the setpoints in the vector $M_h(i)$ can be described by the following equations:

$$Y_M = \frac{1}{2}\arctan\left(\frac{Y_T}{L_2 - Z_T}\right)$$

$$X_M = \frac{1}{2}\arctan\left(\frac{X_T}{L_1 + \sqrt{(L_2 - Z_T)^2 + Y_T^2}}\right)$$

$$Z_M = L_0 \sqrt{\left(L_1 + \sqrt{(L_2 - Z_T)^2 + Y_T^2}\right)^2 + X_T^2}$$

The setpoints for the high bandwidth actuators in the vector $M_h(i)$ and those for the standard actuators in the filtered (and possibly delayed by "j" cycles) vector M'(i−j) can now be sent to the servo loop closure algorithms of the respective controllers. There they will be compared to the measured positions of the actuators, and commanded actions computed to drive the difference between the commanded setpoints and the measured positions towards zero.

Alternate Embodiments

Although the system for transmitting the various position vectors to the mechanisms and their respective components is described in general terms, those skilled in the art will realize that transmission systems of any type now known or yet to be discovered can be used. Accordingly, the invention is not limited to any particular type of transmission systems.

The order in which the steps of the present method are performed is purely illustrative in nature. In fact, the steps can be performed in any order or in parallel, unless otherwise indicated by the present disclosure. An equivalent alternate embodiment passes the original trajectory through a high-pass filter before transmitting the command vectors to the fast mechanism's servos, then uses the difference between the original and high-pass-filtered vectors for the standard mechanism's servos.

The method of the present invention may be performed in hardware, software, or any combination thereof, as those terms are currently known in the art. In particular, the present method may be carried out by software, firmware, and/or microcode operating on a computer or computers of any type. Additionally, software embodying the present invention may comprise computer instructions in any form (e.g., source code, object code, and/or interpreted code, etc.) stored in any computer-readable medium (e.g., ROM, RAM, magnetic media, punched tape or card, compact disc (CD), digital versatile disc (DVD), and/or BluRay disc, etc.). Furthermore, such software may also be in the form of a computer data signal encoded or modulated on a carrier wave, such as but not limited to that found within the well-known Web pages or other signals transferred among devices connected to and with computer networks, such as the Internet. Accordingly, the present invention is not limited to any particular platform, unless specifically stated otherwise in the present disclosure.

While particular embodiments of the present invention have been shown and described, it will be apparent to those skilled in the art that various changes and modifications in form and details may be made therein without departing from the spirit and scope of the invention as defined by the following claims. Accordingly, the appended claims encompass within their scope all such changes and modifications.

We claim:

1. A method of generating a controlled object trajectory in an automated machine, the automated machine comprising at least one controller, a first mechanism, and a second mechanism attached to and moved by the first mechanism, all operatively coupled to each other, wherein the object is attached to and moved by the second mechanism, the method comprising:

(a) in the at least one controller:
  interpolating an object trajectory to form an ideal vector T in a first coordinate set and a command vector M in a second coordinate set;
  low pass filtering said command vector M to determine a filtered command vector M' and a filtered trajectory vector T' in the first coordinate set; and
  computing a vector subtraction of the filtered trajectory vector T' from the ideal vector T, the vector subtraction resulting in a mechanism trajectory vector $T_h$;
(b) communicating the filtered command vector M' to the first mechanism and the mechanism trajectory vector $T_h$ to the second mechanism; and
(c) moving each respective mechanism according to the command vector M' and trajectory vector $T_h$ so that the object follows the object trajectory, wherein the low pass filtering further comprises performing a forward kinematic transformation on the filtered command vector M' to determine the filtered trajectory vector T'.

2. The method of claim 1, further comprising delaying the filtered command vector M' prior to said communicating.

3. The method of claim 1, wherein interpolating the object trajectory further comprises performing an inverse kinematic transformation on said ideal vector T to form the command vector M.

4. The method of claim 1, wherein communicating the mechanism trajectory vector $T_h$ further comprises performing an inverse kinematic transformation to determine a mechanism command vector $M_h'$ in the second coordinate set.

5. The method of claim 1, wherein the first mechanism comprises a plurality of actuators.

6. The method of claim 1, wherein the second mechanism comprises a plurality of actuators.

7. The method of claim 1, wherein the object is a tool.

8. The method of claim 1, wherein the second mechanism compensates for errors in the filtered command vector W.

9. The method of claim 1, further comprising repeating said steps (a), (b), and (c) for each of a plurality of second mechanisms each mounted on a respective first mechanism.

10. The method of claim 9, wherein each of the plurality of first mechanisms comprises a slow mechanism and each of the plurality of second mechanisms comprises a fast mechanism.

11. The method of claim 9, wherein each of the plurality of first mechanisms comprises a fast mechanism and each of the plurality of second mechanisms comprises a slow mechanism.

12. An apparatus for generating a controlled object trajectory in an automated machine, comprising:
at least one controller configured to:
interpolate an object trajectory to form an ideal vector T in a first coordinate set and a command vector M in a second coordinate set;
low pass filter said command vector M to determine a filtered command vector M' and a filtered trajectory vector T' in the first coordinate set; and
compute a vector subtraction of the filtered trajectory vector T' from the ideal vector T, the vector subtraction resulting in a mechanism trajectory vector $T_h$; and
communication circuitry for communicating the filtered command vector M' to a first mechanism and the mechanism trajectory vector $T_h$ to a second mechanism attached to and moved by the first mechanism, wherein the first mechanism and the second mechanism operatively coupled to each other and to the at least one controller;
wherein each respective mechanism is moved according to the command vector M' and trajectory vector $T_h$ so that the object follows the object trajectory and the object is attached to and moved by the second mechanism, and
wherein the controller is further configured to perform a forward kinematic transformation on the filtered command vector M' to determine the filtered trajectory vector T'.

13. The apparatus of claim 12, wherein the filtered command vector M' passes through a delay buffer prior to said communicating.

14. The apparatus of claim 12, wherein the at least one controller is further configured to perform an inverse kinematic transformation on said ideal vector T to form the command vector M.

15. The apparatus of claim 12, wherein the communication circuitry is further configured to perform an inverse kinematic transformation to determine a mechanism command vector $M_h'$ in the second coordinate set.

16. The apparatus of claim 12, wherein the first mechanism comprises a plurality of actuators.

17. The apparatus of claim 12, wherein the second mechanism comprises a plurality of actuators.

18. The apparatus of claim 12, wherein the object is a tool.

19. The apparatus of claim 12, wherein the second mechanism compensates for errors in the filtered command vector W.

20. The apparatus of claim 12, further comprising a plurality of second mechanisms each mounted on a respective first mechanism.

21. The apparatus of claim 20, wherein each of the plurality of first mechanisms comprises a slow mechanism and each of the plurality of second mechanisms comprises a fast mechanism.

22. The apparatus of claim 20, wherein each of the plurality of first mechanisms comprises a fast mechanism and each of the plurality of second mechanisms comprises a slow mechanism.

23. An apparatus for generating a controlled object trajectory in an automated machine, the automated machine comprising at least one controller, a first mechanism, and a second mechanism attached to and moved by the first mechanism, all operatively coupled to each other, wherein the object is attached to and moved by the second mechanism, comprising means for:
(a) in the at least one controller:
interpolating an object trajectory to form an ideal vector T in a first coordinate set and a command vector M in a second coordinate set;
low pass filtering said command vector M to determine a filtered command vector M' and a filtered trajectory vector T' in the first coordinate set; and
computing a vector subtraction of the filtered trajectory vector T' from the ideal vector T, the vector subtraction resulting in a mechanism trajectory vector $T_h$;
(b) communicating the filtered command vector M' to the first mechanism and the mechanism trajectory vector $T_h$ to the second mechanism; and
(c) moving each respective mechanism according to the command vector M' and trajectory vector $T_h$ so that the object follows the object trajectory,
wherein the means for low pass filtering further comprise means for performing a forward kinematic transformation on the filtered command vector M' to determine the filtered trajectory vector T'.

24. The apparatus of claim 23, further comprising means for delaying the filtered command vector M' prior to said communicating.

25. The apparatus of claim 23, wherein the means for interpolating the object trajectory further comprise means for performing an inverse kinematic transformation on said ideal vector T to form the command vector M.

26. The apparatus of claim 23, wherein the means for communicating the mechanism trajectory vector $T_h$ further comprise means for performing an inverse kinematic transformation to determine a mechanism command vector $M_h'$ in the second coordinate set.

27. The apparatus of claim 23, wherein the first mechanism comprises a plurality of actuators.

28. The apparatus of claim 23, wherein the second mechanism comprises a plurality of actuators.

29. The apparatus of claim 23, wherein the object is a tool.

30. The apparatus of claim 23, wherein the second mechanism comprises means for compensating for errors in the filtered command vector W.

31. The apparatus of claim 23, further comprising means for repeating said steps (a), (b), and (c) for each of a plurality of second mechanisms each mounted on a respective first mechanism.

32. The method of claim 31, wherein each of the plurality of first mechanisms comprises a slow mechanism and each of the plurality of second mechanisms comprises a fast mechanism.

33. The method of claim 31, wherein each of the plurality of first mechanisms comprises a fast mechanism and each of the plurality of second mechanisms comprises a slow mechanism.

* * * * *